(12) United States Patent
Kim et al.

(10) Patent No.: US 8,779,629 B2
(45) Date of Patent: Jul. 15, 2014

(54) APPARATUS FOR TRANSMITTING AND RECEIVING WIRELESS ENERGY USING META-MATERIAL STRUCTURES HAVING ZERO REFRACTIVE INDEX

(75) Inventors: Hyoung Jun Kim, Seoul (KR); Chul Hun Seo, Seoul (KR); Eung Ju Kim, Suwon (KR); Jeong Hoon Kim, Seoul (KR); Kwang Du Lee, Suwon (KR); Sang Hoon Hwang, Seoul (KR); Jung Ho Yoon, Anyang-si (KR); Chul Gyun Park, Suwon (KR)

(73) Assignees: Samsung Electro-Mechanics Co., Ltd., Suwon, Gyunggi-Do (KR); Soongsil University Research Consortium Techno-Park, Seoul (KR)

( * ) Notice: Subject to any disclaimer, the term of this patent is extended or adjusted under 35 U.S.C. 154(b) by 454 days.

(21) Appl. No.: 12/848,915

(22) Filed: Aug. 2, 2010

(65) Prior Publication Data

US 2011/0266879 A1 Nov. 3, 2011

(30) Foreign Application Priority Data

Apr. 30, 2010 (KR) .................. 10-2010-0041053

(51) Int. Cl.
*H01F 27/42* (2006.01)
*H01F 38/00* (2006.01)
*H01F 37/00* (2006.01)

(52) U.S. Cl.
USPC .......................................... 307/104; 343/909

(58) Field of Classification Search
USPC ............................................. 307/104
See application file for complete search history.

(56) References Cited

U.S. PATENT DOCUMENTS

| | | | |
|---|---|---|---|
| 6,963,122 B1 | 11/2005 | Soenen et al. | |
| 7,013,436 B1 | 3/2006 | Morton et al. | |
| 7,528,724 B2 | 5/2009 | Horch | |
| 8,319,473 B2 | 11/2012 | Choi et al. | |
| 2002/0067106 A1 | 6/2002 | Sunwoo et al. | |
| 2008/0024792 A1* | 1/2008 | Pendry et al. | 356/602 |
| 2010/0109445 A1* | 5/2010 | Kurs et al. | 307/104 |
| 2010/0277005 A1* | 11/2010 | Karalis et al. | 307/104 |
| 2011/0133568 A1* | 6/2011 | Wang et al. | 307/104 |
| 2011/0204891 A1 | 8/2011 | Drake et al. | |
| 2011/0241609 A1 | 10/2011 | Choi et al. | |
| 2011/0267247 A1 | 11/2011 | Choi et al. | |

FOREIGN PATENT DOCUMENTS

| | | |
|---|---|---|
| KR | 1020090063599 A | 6/2009 |
| KR | 1020100024518 A | 3/2010 |

OTHER PUBLICATIONS

John Pendry, Manipulating the near filed with metamaterials, Sep. 2004, Optics & Photonics News, pp. 1-6.*
Office Action from counterpart Korean Patent Application No. 10-2010-0041053, mailed Feb. 27, 2012, 5 pages.

* cited by examiner

*Primary Examiner* — Rexford Barnie
*Assistant Examiner* — Toan Vu
(74) *Attorney, Agent, or Firm* — Blakely Sokoloff Taylor & Zafman LLP

(57) ABSTRACT

Disclosed herein is an apparatus for transmitting and receiving wireless energy using meta-material structures having a zero refractive index. The apparatus includes a wireless energy transmission unit and a wireless energy reception unit. When external power is applied thereto, the wireless energy transmission unit generates wireless energy to be wirelessly transmitted, and then wirelessly transmits wireless energy, which is normally propagated radially when the generated wireless energy is transmitted, using a magnetic resonance method while concentrating the wireless energy in one direction.

9 Claims, 5 Drawing Sheets

APPARATUS FOR TRANSMITTING AND RECEIVING WIRELESS ENERGY USING META-MATERIAL STRUCTURES HAVING ZERO REFRACTIVE INDEX

CROSS REFERENCE TO RELATED APPLICATION

This application claims the benefit of Korean Patent Application No. -10-2010-0041053, filed on Apr. 30, 2010, entitled "Apparatus for transmitting and receiving Wireless Energy using Meta Material Structure having Zero Refractive Index," which is hereby incorporated by reference in its entirety into this application.

BACKGROUND OF THE INVENTION

1. Technical Field

The present invention relates to an apparatus for transmitting and receiving wireless energy using meta-material structures having a zero refractive index.

2. Description of the Related Art

The development of wireless communication technology is leading to a ubiquitous information environment in which anyone can exchange desired information anytime and anywhere.

Also, since most communication and information devices are dependent on batteries or supplied with power through electric codes and are then used, the utilization of the devices is limited.

In order to overcome this problem, many technologies for wirelessly transmitting electric power have been developed.

Representative examples of such technologies include microwave reception technology using microwaves, magnetic induction technology using a magnetic field, and magnetic resonance technology using energy conversion between magnetic and electric fields.

Microwave reception technology is advantageous in that it can transmit electric power over a long distance because it radiates microwaves into the air through an antenna, but has limited efficiency in the transmission of electric power because radiation loss occurring in the air is great.

Furthermore, magnetic induction technology is advantageous in that it is highly efficient at transmitting electric power because it uses magnetic energy coupling based on transmitting-side primary and receiving-side secondary coils.

However, according to magnetic induction technology, in order to transmit electric power, the transmitting-side primary coil and the receiving-side secondary coil must be placed within a short distance of about several mm.

Furthermore, magnetic induction technology is disadvantageous in that the transmission efficiency of electric power changes significantly depending on the arrangement of the transmitting-side primary coil and the receiving-side secondary coil and in that the calorific value is high.

For the above reasons, there is being developed magnetic resonance technology which is similar to magnetic induction technology, but which is configured to focus energy on a specific resonant frequency using a coil-type inductor L and a capacitor C and transmit electric power in the form of magnetic energy.

The magnetic resonance technology is advantageous in that it can transmit relatively large amounts of electric power over a distance up to several meters, but requires a high quality factor.

Here, a conventional wireless energy transmission and reception loop using the magnetic resonance technology includes a disk unit configured to include two conductor plates and a dielectric, inserted between the two conductor plates, and a ring-shaped wire unit connected to both ends of the disk unit. In order to achieve a high quality factor, the intensity of electric and magnetic fields generated by the disk unit and the wire unit must be very strong.

However, in the conventional wireless energy transmission and reception loop, in order to increase the intensity of the electric and magnetic fields, the sizes of the disk unit and the wire unit should be increased, so that the application of the conventional wireless energy transmission and reception loop to an actual wireless energy transmission and reception apparatus is inappropriate.

Furthermore, since wireless energy generated by the wireless energy transmission loop is radially propagated and then transmitted, there is loss corresponding to wireless energy which is propagated to the sides and rear of the wireless energy transmission loop.

Accordingly, there is a need for an apparatus for transmitting and receiving wireless energy, which is small enough to apply to an actual apparatus for transmitting and receiving wireless energy and which can improve the transmission distance and transmission efficiency.

SUMMARY OF THE INVENTION

Accordingly, the present invention has been made keeping in mind the above problems occurring in the prior art, and the present invention is intended to provide an apparatus for transmitting and receiving wireless energy using meta-material structures having a zero refractive index, which is small in size and which can improve the transmission distance and transmission efficiency.

According to the present invention, there is provided an apparatus for transmitting and receiving wireless energy using meta-material structures having a zero refractive index, including a wireless energy transmission unit for, when external power is applied thereto, generating wireless energy to be wirelessly transmitted, and then wirelessly transmitting wireless energy, which is normally propagated radially when the generated wireless energy is transmitted, using a magnetic resonance method while concentrating the wireless energy in one direction; and a wireless energy reception unit for wirelessly receiving the wireless energy, transmitted by the wireless energy transmission unit, using the magnetic resonance method while concentrating the wireless energy in one direction.

The wireless energy transmission unit includes a wireless transmission loop configured to, when external power is applied thereto, generate the wireless energy using a resonance frequency based on an inductor L and a capacitor C and then wirelessly transmit the generated wireless energy using the magnetic resonance method; and a wireless transmission meta-material structure placed in a wireless transmission path, and configured to have a zero refractive index so as to transmit the wireless energy, which is normally propagated radially when the generated wireless energy is transmitted, while concentrating the wireless energy in one direction.

The wireless transmission loop includes a disk unit comprising first and second conductor plates configured to correspond to each other and to be spaced apart from each other and a dielectric material inserted between the first and second conductor plates, the disk unit functioning as a capacitor so that an electric field can be induced between the first and second conductor plates; and a ring-shaped wire unit having one end connected to the first conductor plate and a remaining end connected to the second conductor plate, the ring-shaped wire unit functioning as an inductor so that a magnetic field can be induced by the electric field.

The wire unit further includes first and second terminals for connecting with the power, and, when the power is applied through the first and second terminals, current flows through the wire unit and thus the electric field is generated in the disk unit, so that the magnetic field is induced in the wire unit by the generated electric field, with the result that the wireless energy is transmitted using the magnetic resonance method.

The wireless transmission meta-material structure includes a substrate configured to have a diameter larger than that of the wireless transmission loop; and a meta-material structure configured such that meta cells having a split ring resonance pattern are repeatedly arranged on the substrate.

The meta-material structure includes a plurality of first meta cells each formed of one or more thin metal films having a split ring resonator form and repeatedly formed on upper and lower surfaces of the substrate in an identical manner so as to have symmetry; and a plurality of second meta cells each formed of one thin metal film having a split ring resonator form and repeatedly formed on a side of the substrate so that gaps of the thin metal films are directed toward an identical direction so as to have directionality.

The wireless energy reception unit includes a wireless reception loop configured to wirelessly receive the wireless energy, transmitted by the wireless energy transmission unit, using the magnetic resonance method using a resonance frequency according to an inductor L and a capacitor C; and a wireless reception meta-material structure placed in a wireless reception path and configured to have the zero refractive index and to receive the wireless energy while concentrating the wireless energy in one direction.

The wireless reception loop includes a disk unit comprising first and second conductor plates configured to correspond to each other and to be spaced apart from each other and a dielectric material inserted between the first and second conductor plates, the disk unit functioning as a capacitor so that an electric field can be induced between the first and second conductor plates; and a ring-shaped wire unit having one end connected to the first conductor plate and a remaining end connected to the second conductor plate, the ring-shaped wire unit functioning as an inductor so that a magnetic field can be induced by the electric field.

The wire unit further includes first and second terminals for connecting with a load device, and, when the wireless energy is received from the wireless energy transmission unit using the magnetic resonance method, the electric field is induced in the disk unit and thus the magnetic field is induced in the wire unit by the induced electric field, so that the induced magnetic field causes current to flow through the wire unit, with the result that the load device is supplied or charged with the wireless energy.

The wireless reception meta-material structure includes a substrate configured to have a diameter larger than that of the wireless reception loop; and a meta-material structure configured such that meta cells having a split ring resonance pattern are repeatedly arranged on the substrate.

The meta-material structure includes a plurality of first meta cells each formed of one or more thin metal films having a split ring resonator form and repeatedly formed on upper and lower surfaces of the substrate in an identical manner so as to have symmetry; and a plurality of second meta cells each formed of one thin metal film having a split ring resonator form and repeatedly formed on a side of the substrate so that gaps of the thin metal films are directed toward an identical direction so as to have directionality.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

If in the specification, detailed descriptions of well-known functions or configurations may unnecessarily make the gist of the present invention obscure, the detailed descriptions will be omitted.

The terms and words used in the present specification and the accompanying claims should not be limitedly interpreted as having their common meanings or those found in dictionaries, but should be interpreted as having meanings adapted to the technical spirit of the present invention on the basis of the principle that an inventor can appropriately define the concepts of terms in order to best describe his or her invention.

It should be noted that the same reference numerals are used throughout the different drawings to designate the same or similar components as often as possible.

Embodiments of the present invention will be described in detail with reference to the accompanying drawings.

Figure 1:
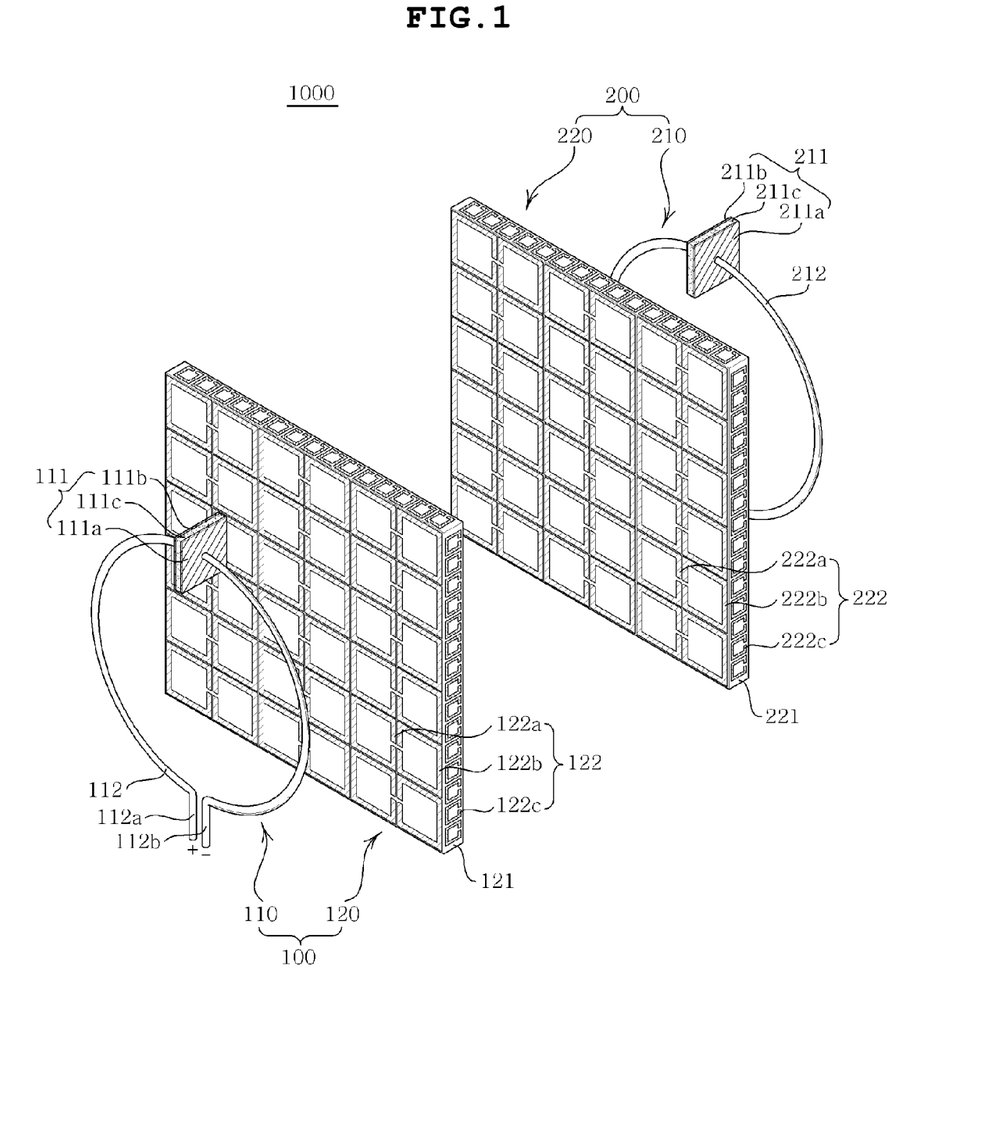
FIG. 1 is a schematic perspective view of a wireless energy transmission and reception apparatus using meta-material structures having a zero refractive index according to an embodiment of the present invention.
Figure 2:
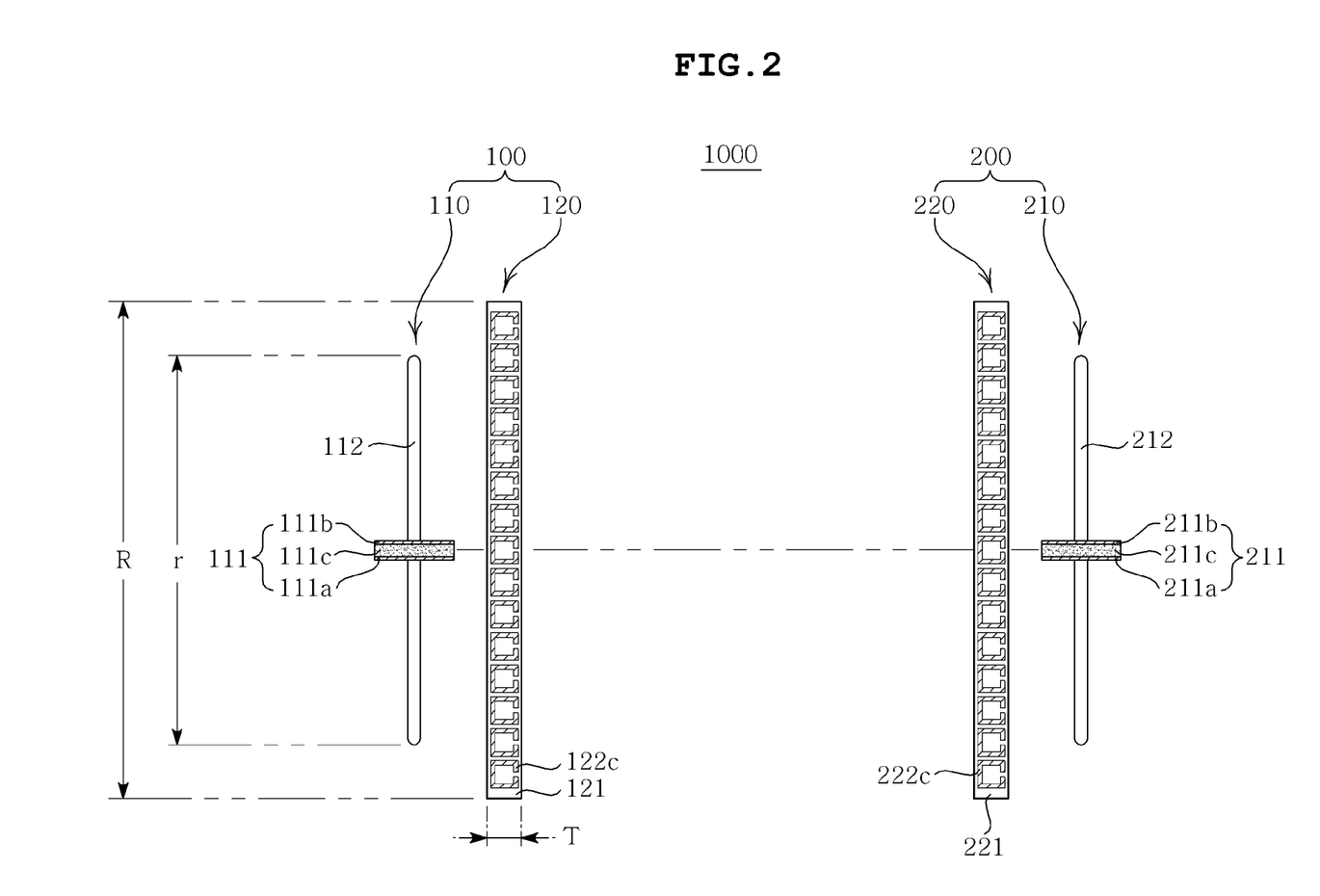
FIG. 2 is a top view of the wireless energy transmission and reception apparatus shown in FIG. 1.

FIG. 1 is a schematic perspective view of a wireless energy transmission and reception apparatus using meta-material structures having a zero refractive index according to an embodiment of the present invention. FIG. 2 is a top view of the wireless energy transmission and reception apparatus shown in FIG. 1.

Referring to FIGS. 1 and 2, the wireless energy transmission and reception apparatus 1000 according to the embodiment of the present invention includes a wireless energy transmission unit 100 and a wireless energy reception unit 200.

When external power (not shown) is applied to the wireless energy transmission unit 100, the wireless energy transmission unit 100 generates wireless energy and wirelessly transmits the generated wireless energy using a magnetic resonance method. Here, the wireless energy transmission unit 100 transmits wireless energy, which is normally propagated radially when the wireless energy is transmitted, while concentrating the wireless energy in one direction.

The wireless energy reception unit 200 wirelessly receives the wireless energy, transmitted by the wireless energy transmission unit 100, using the magnetic resonance method while concentrating the wireless energy in one direction.

First, the wireless energy transmission unit 100 will be described below. The wireless energy transmission unit 100 includes a wireless transmission loop 110 and a wireless transmission meta-material structure 120.

When external power is applied to the wireless energy transmission unit 100, the wireless transmission loop 110 generates wireless energy using a resonance frequency based on an inductor L and a capacitor C, and transmits the generated wireless energy using the magnetic resonance method.

The wireless transmission meta-material structure 120 is configured to have a zero refractive index, and is placed in a transmission path along which wireless energy is transmitted by the wireless transmission loop 110. The wireless transmission meta-material structure 120 transmits wireless energy, which is normally propagated radially when the wireless energy is wirelessly transmitted, while concentrating the wireless energy in one direction.

More particularly, the wireless transmission loop 110 includes a disk unit 111 and a ring-shaped wire unit 112 connected to both ends of the disk unit 111.

The disk unit 111 functions as a capacitor C in magnetic field-based LC resonance. The disk unit 111 includes first and second conductor plates 111a and 111b configured to correspond to each other and spaced apart from each other and a dielectric material 111c inserted between the first and second conductor plates 111a and 111b . When power is supplied through input and output terminals formed in the wire unit 112, an electric field is generated between the first and second conductor plates 111a and 111b.

Although the first and second conductor plates 111a and 111b generally have a circular or square shape, they are not limited thereto.

However, it is preferred that the first and second conductor plates 111a and 111b preferably have a square shape which can acquire higher capacitance due to its area being wider than that of a circular shape for the same radius and which can be more easily fabricated, as shown in FIG. 1.

Air or an additional dielectric having specific dielectric constant s may be used as the dielectric material 111c which is inserted between the first and second conductor plates 111a and 111b.

The intensity of the electric field generated by the disk unit 111 is determined by the size of the first and second conductor plates 111a and 111b , the distance between the first and second conductor plates 111a and 111b , and the dielectric constant s of the dielectric material 111c.

The wire unit 112 functions as an inductor L in magnetic field-based LC resonance. The wire unit 112 is formed of a ring-shaped wire, one end of which is connected to the first conductor plate 111a and the other end of which is connected to the second conductor plate 111b.

Here, a capacitor or a variable capacitor for varying or compensating for the resonance frequency may be connected to both ends of the wire unit 112 to which the first and second conductor plates 111a and 111b are connected, instead of the disk unit 111.

Furthermore, the wire unit 112 includes first and second terminals 112a and 112b, and supplies power through the first and second terminals 112a and 112b.

When power (not shown) is supplied to the first and second terminals 112a and 112b of the wire unit 112, current flows through the wire unit 112.

When the current is applied to the disk unit 111 through the wire unit 112, an electric field is generated. The electric field causes a magnetic field to be induced from the wire unit 112.

The induced magnetic field becomes a medium which wirelessly transmits energy across the space of the wireless energy transmission and reception apparatus 1000.

Figure 3:
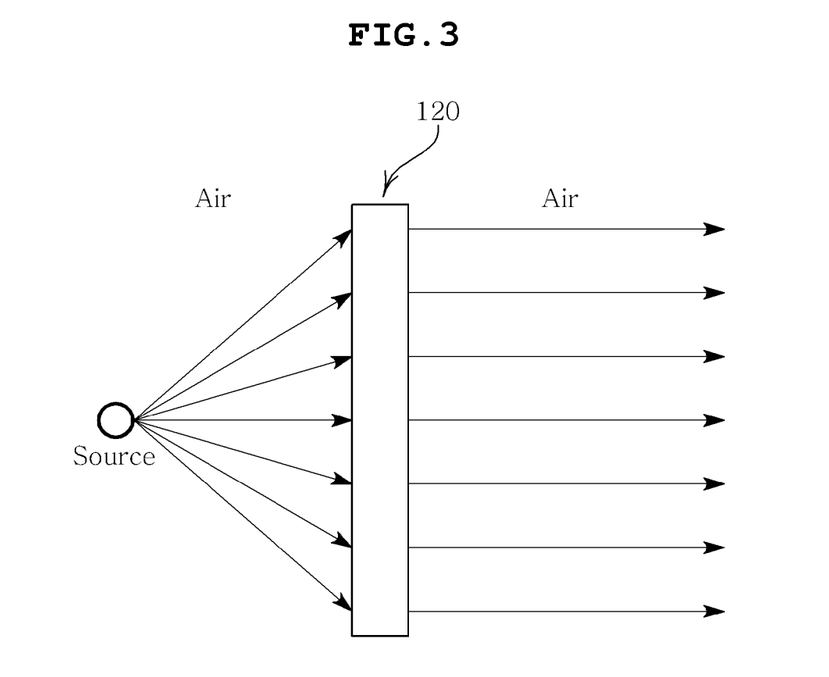
FIG. 3 is a schematic conceptual diagram illustrating the function of a wireless transmission meta-material structure according to an embodiment of the present invention.

FIG. 3 is a schematic conceptual diagram illustrating the function of the wireless transmission meta-material structure 120 according to an embodiment of the present invention.

Referring to FIG. 3, the wireless transmission meta-material structure 120 has a zero refractive index n, and transfers magnetic field energy, which is generated by the wireless transmission loop 110 and is radially propagated, in a specific direction (e.g., a direction toward the reception unit 200). The wireless transmission meta-material structure 120 is placed in a transmission path along which the wireless energy generated by the wireless transmission loop 110 is transmitted.

Here, in order for the wireless transmission meta-material structure 120 to transmit the magnetic field energy, which is normally propagated radially, in a specific direction, the refractive index n of the wireless transmission meta-material structure 120 should be zero.

In the present invention, 'zero refractive index n' means that all pieces of radially incident magnetic field energy are refracted vertically with respect to an incident surface.

Accordingly, the wireless transmission unit 100 according to the present invention can transfer the magnetic field energy, generated by the wireless transmission loop 110, to the wireless energy reception unit 200 through the wireless transmission meta-material structure 120 while concentrating the magnetic field energy in one direction. Consequently, the transmission efficiency of wireless energy can be improved.

The wireless transmission meta-material structure 120 includes a substrate 121 and a meta-material structure in which unit cells 122 each formed of a split ring resonance pattern and configured to have a meta-material structure (hereinafter referred to as 'meta cells') are repeatedly arranged and formed on the substrate 121.

The size and shape of the meta cells 122 and the distance therebetween are not limited, but the meta cells 122 are formed so that the refractive index n of the wireless transmission meta-material structure 120 can be zero.

In general, the refractive index n is expressed, as follows:

$$n = \sqrt{\sqrt{e_{\mathit{eff}} m_{\mathit{eff}}}} \tag{1}$$

where $e_{\mathit{eff}}$ is the effective dielectric constant of the wireless transmission meta-material structure 120, and $m_{\mathit{eff}}$ is the effective magnetic permeability of the wireless transmission meta-material structure 120.

Furthermore, the effective dielectric constant $e_{\mathit{eff}}$ can be expressed, as follows:

$$e_{\mathit{eff}}(W) = 1 - W_P^2 / W^2 \tag{2}$$

where $W_P$ is the plasma frequency of the wireless transmission meta-material structure 120, and W is the resonance frequency of the wireless transmission meta-material structure 120.

If in order to make the refractive index n zero, Equation 2 is substituted into Equation 1, it is required that $W_P=W$.

Accordingly, when the meta cells 122 of the wireless transmission meta-material structure 120 according to the present invention are repeatedly arranged and formed on the substrate 121, the size and shape of the meta cells 122 and the distance therebetween are adjusted such that the plasma frequency $W_P$ and resonance frequency W of the wireless transmission meta-material structure 120 are equal to each other.

The meta-material structure in which the meta cells 122 are repeatedly arranged and formed will be described in detail below with reference to FIGS. 4 and 5.

Furthermore, it is preferred that the diameter R of the wireless transmission meta-material structure 120 be greater than the diameter r of the wireless transmission loop 110 so that energy, which is generated by the wireless transmission loop 110 and is normally propagated radially, can all be accommodated (refer to FIG. 2).

Meanwhile, the wireless energy reception unit 200 will be described below. The wireless energy reception unit 200 includes a wireless reception loop 210 and a wireless reception meta-material structure 220.

The wireless reception loop 210 receives the wireless energy, transmitted by the wireless energy transmission unit 100, using the magnetic resonance method using the resonance frequency based on an inductor L and a capacitor C.

The wireless reception meta-material structure 220 is configured to have a zero refractive index, and is placed in a reception path along which the wireless energy transmitted by the transmission unit 100 is received. The wireless reception meta-material structure 220 concentrates the wireless energy in one direction.

Here, the wireless reception loop 210 has the same elements as the wireless transmission loop 110, and the wireless reception meta-material structure 220 has the same elements as the wireless transmission meta-material structure 120. Accordingly, detailed descriptions of the same elements will be omitted here.

In the wireless energy transmission unit 100, power is connected to the first and second terminals 112a and 112b formed in the wire unit 112 of the wireless transmission loop 110, whereas in the wireless energy reception unit 200, a load device (not shown), such as an electric power consumption device or a charger, is connected to first and second terminals (not shown) formed in the wire unit 212 of the wireless reception loop 210. Here, the load device (not shown) consumes or performs charging using magnetic field energy (e.g., wireless energy) received from the wireless transmission unit 100.

That is, contrary to the process in which the wireless energy transmission unit 100 transmits wireless energy, in the wireless energy reception unit 200, in order to receive the magnetic field energy transmitted by the wireless transmission unit 100, the wireless reception meta-material structure 220 receives the magnetic field energy and the magnetic field causes current to flow through the wireless reception loop 210. Accordingly, the load device can be supplied or charged with electric power.

Figure 4:
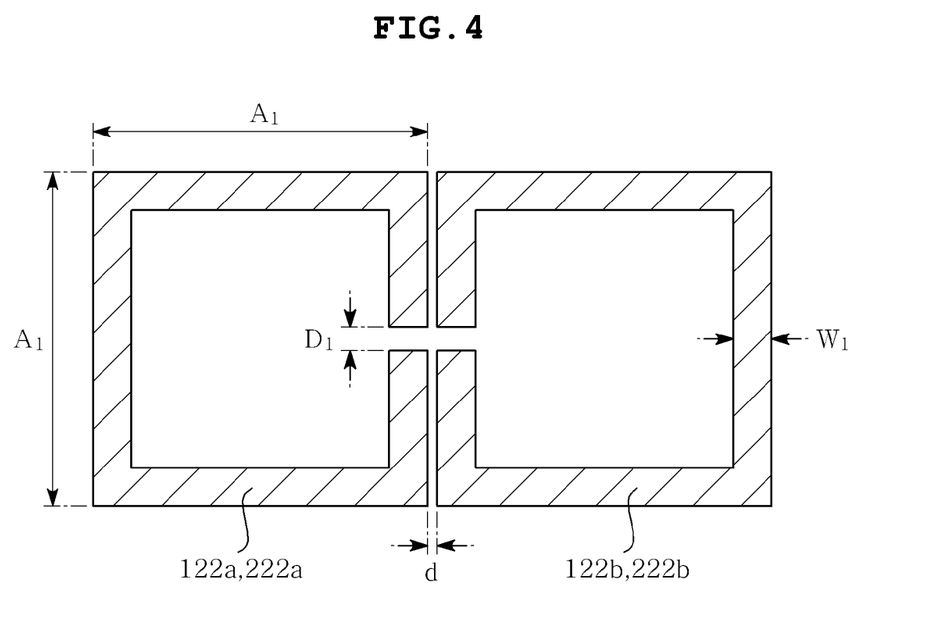
FIG. 4 is a diagram showing an example of the unit meta cells of a first meta-material structure in the wireless energy transmission and reception apparatus using the meta-material structures having a zero refractive index according to an embodiment of the present invention.

FIG. 4 is a diagram showing an example of the unit meta cells of wireless transmission and reception meta-material structures according to an embodiment of the present invention. FIG. 5 is a diagram showing an example of another type of unit meta cells of wireless transmission and reception meta-material structures according to an embodiment of the present invention.

Referring to FIG. 4, meta cells (hereinafter referred to as 'first meta cells') 122a and 122b or 222a and 222b formed on the upper and lower surfaces of the substrate 121 or 221 of the wireless transmission or reception meta-material structure 120 or 220 are formed of two thin metal films SRR having the same shape and size and a split ring resonator form, so that the gaps $D_1$ of the two thin metal films SRR face each other.

In the wireless transmission or reception meta-material structure 120 or 220 according to the embodiment of the present invention, the first meta cells 122a and 122b or 222a and 222b are repeatedly formed on the upper and lower surfaces of the substrate 121 or 221 in the same manner so that the transmitting and receiving sides can be symmetrical.

Referring to HG. 5, a meta cell (hereinafter referred to as a 'second meta cell') 122c or 222c formed on the side of the substrate 121 or 221 of the wireless transmission or reception meta-material structure 120 or 220 is formed of a thin metal film having a split ring resonator (SRR) form.

In the wireless transmission or reception meta-material structure 120 or 220 according to the embodiment of the present invention, the second meta cell 122c or 222c is repeatedly formed on the overall side of the substrate 121 or 221. The size of the second meta cell 122c or 222c is proportional to the thickness of the substrate 121 or 221.

Here, it is preferred that the gaps $D_2$ of all the second meta cells 122c or 222c be directed toward the same direction so that they can have directionality related to a transmission direction.

The direction of the gap $D_2$ is what achieves directionality related to the transmission direction of wireless energy, as described above. If the direction of the gap $D_2$ is directed toward, for example, the receiving side, the transmitting side can transmit wireless energy to the receiving side while concentrating the wireless energy.

Meanwhile, although the first and second meta cells have been described with reference to FIGS. 4 and 5, the present invention is not limited to the above embodiments, but the first and second meta cells may be formed in various forms.

Figure 6:
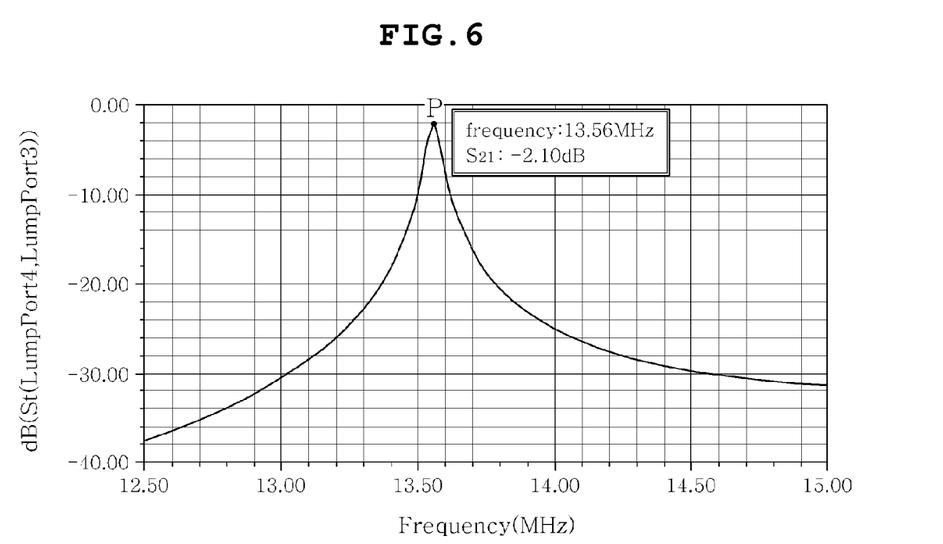
FIG. 6 is a simulation graph showing a gain curve depending on operating frequencies in the wireless energy transmission and reception apparatus using meta-material structures having a zero refractive index according to the embodiment of the present invention.
Figure 7:
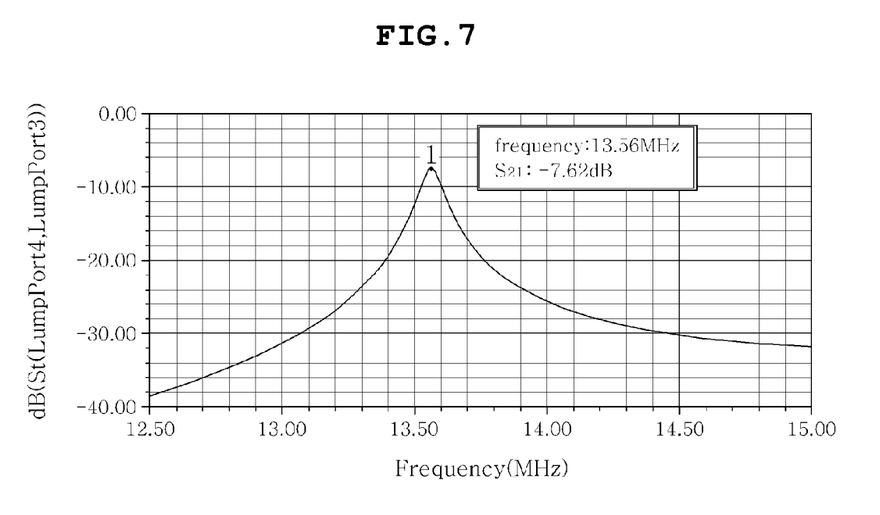
FIG. 7 is a simulation graph showing a gain curve depending on operating frequencies in a conventional apparatus for transmitting and receiving wireless energy having no meta-material structures of FIG. 6.

FIG. 6 is a simulation graph showing a gain curve depending on operating frequencies in the wireless energy transmission and reception apparatus using meta-material structures having a zero refractive index according to the embodiment of the present invention. FIG. 7 is a simulation graph showing a gain curve depending on operating frequencies in a conventional apparatus for transmitting and receiving wireless energy having no meta-material structures.

The wireless transmission and reception loops 110 and 210 used in the simulation of FIG. 6 are designed to have the same size and structure, and the wireless transmission and reception loops 110 and 210 used in the simulation of FIG. 6 are designed to have the same size and structure. The distance between the wireless energy transmission unit 100 and the wireless energy reception unit 200 (i.e., a transmission distance) is approximately 500 mm.

In more detail, the wireless transmission or reception loop 110 or 210 has a diameter (r) of 330 mm. Furthermore, the substrate 121 or 221 used in the wireless transmission and reception meta-material structure 120 or 220 is a square substrate having a horizontal or vertical length (R) of 434 mm and a thickness (T) of 30 mm. The substrate 121 or 221 has a dielectric constant ($\epsilon$) of 2.2.

Furthermore, the first meta cells 122a and 122b or 222a and 222b formed on the upper and lower surfaces of the substrate 121 or 221 are formed of two thin metal films SRR having a split ring resonator form and a square shape, the horizontal or vertical length $A_1$ of which is 70 mm, so that the gaps $D_1$ of the two thin metal films SRR can face each other, as shown in FIG. 4.

Here, the distance d between the two thin metal films SRR having a split ring resonator form is 2 mm, and the width $W_1$ and gap $D_1$ of the thin metal films SRR having a split ring resonator form are 8 mm and 5 mm, respectively.

Figure 5:
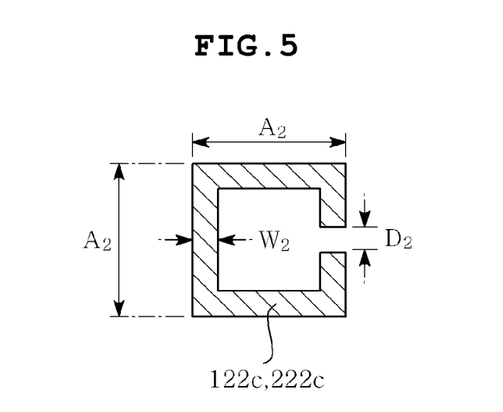
FIG. 5 is a diagram showing an example of a unit meta cell of a second meta-material structure in wireless transmission and reception meta-material structures according to an embodiment of the present invention.

Meanwhile, the second meta cell 122c or 222c formed on the side of the substrate 121 or 221 is formed of a thin metal film SRR having a split ring resonator form and a square shape, the horizontal or vertical length $A_2$ of which is 24 mm, as shown in FIG. 5.

Here, the distance between the neighboring thin metal films SRR having a split ring resonator form is 2 mm, as in the first meta cells 122a and 122b or 222a and 222b, and the width $W_2$ and gap $D_2$ of the thin metal films SRR having a split ring resonator form are 4 mm and 4 mm, respectively.

When the wireless transmission and reception meta-material structures 120 and 220 designed as described above are used, the simulation graph showing the gain curve depending on the operating frequencies, as shown in FIG. 6, can be acquired.

From FIG. 6, it can be seen that the maximum gain can be obtained at a point P. This means that the operating frequency at the point P is the resonance frequency of the wireless energy transmission and reception apparatus 1000.

That is, it can be seen that the wireless energy transmission and reception apparatus 1000 according to the embodiment of the present invention has a resonance frequency of about 13.56 MHz at the transmission distance of approximately 500 mm and a maximum gain of −2.1 dB at the resonance frequency of about 13.56 MHz.

The efficiency of transmission between the wireless energy transmission unit 100 and the wireless energy reception unit 200 at the resonance frequency is calculated using the following Equation 3:

Transmission efficiency (%)=(the intensity of a received electric field×the intensity of a received magnetic field)/(the intensity of a transmitted electric field ×the intensity of a transmitted magnetic field)×100    (3)

When an electric power of 1 W is applied to the wireless energy transmission unit 100 according to the embodiment of the present invention at the resonance frequency of 13.56 MHz, a transmission efficiency of about 62% is obtained for a transmission distance of approximately 500 mm using Equation 3.

In contrast, when an electric power of 1 W is applied to the wireless energy transmission unit of a conventional wireless transmission and reception apparatus having no wireless transmission and reception meta-material structures 120 and 220 at a frequency of 13.56 MHz, a transmission efficiency of about 17% is obtained for a transmission distance of approximately 500 mm using Equation 3 (refer to FIG. 7).

From the above description, it can be seen that the wireless energy transmission and reception apparatus 100 having a zero refractive index according to the embodiment of the present invention can significantly improve transmission efficiency for the same transmission distance as compared with the conventional wireless transmission and reception apparatus having no wireless transmission and reception meta-material structures 120 and 220 which has a transmission efficiency of about 17% at a transmission distance of approximately 500 mm.

As described above, in the wireless energy transmission and reception apparatus 1000 according to the embodiment of the present invention, the wireless transmission and reception meta-material structures 120 and 220 having a zero refractive index are placed in the respective wireless transmission and reception paths. Accordingly, the transmission distance and transmission efficiency can be improved because wireless energy can be transferred while it is being concentrated in one direction.

As described above, the wireless energy transmission and reception apparatus according to the embodiments of the present invention are advantageous in that the size is reduced and the transmission distance and transmission efficiency are improved for the same amount of electric power because the meta-material structures having a zero refractive index are used.

Furthermore, the wireless energy transmission and reception apparatus according to the present invention is advantageous in that it has a high quality factor because the meta-material structure having a zero refractive index can be easily added without making additional changes to the conventional construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for transmitting and receiving wireless energy using meta-material structures having a zero refractive index, comprising:
   a wireless energy transmission unit for, when external power is applied thereto, generating wireless energy to be wirelessly transmitted, and then wirelessly transmitting wireless energy, which is normally propagated radially when the generated wireless energy is transmitted, using a magnetic resonance method while concentrating the wireless energy in one direction; and
   a wireless energy reception unit for wirelessly receiving the wireless energy, transmitted by the wireless energy transmission unit, using the magnetic resonance method while concentrating the wireless energy in one direction,
   wherein the wireless energy transmission unit comprises a wireless transmission loop configured to, when external power is applied thereto, generate the wireless energy using a resonance frequency based on an inductor L and a capacitor C and then wirelessly transmit the generated wireless energy using the magnetic resonance method and a wireless transmission meta-material structure placed in a wireless transmission path, and configured to have a zero refractive index so as to transmit the wireless energy, which is normally propagated radially when the generated wireless energy is transmitted, while concentrating the wireless energy in one direction, and
   wherein the wireless transmission meta-material structure includes a substrate configured to have a diameter larger than that of the wireless transmission loop and a meta-material structure configured such that the first meta cells composed by gaps of two thin metal films that are faced to each other in a split ring resonance pattern having the same shape and size are repeatedly arranged on the substrate.

2. The apparatus as set forth in claim 1, wherein the wireless transmission loop comprises:
   a disk unit comprising first and second conductor plates configured to correspond to each other and to be spaced apart from each other and a dielectric material inserted between the first and second conductor plates, the disk unit functioning as a capacitor so that an electric field can be induced between the first and second conductor plates; and a ring-shaped wire unit having one end connected to the first conductor plate and a remaining end connected to the second conductor plate, the ring-shaped wire unit functioning as an inductor so that a magnetic field can be induced by the electric field.

3. The apparatus as set forth in claim 2, wherein:

the wire unit further comprises first and second terminals for connecting with the power, and when the power is applied through the first and second terminals, current flows through the wire unit and thus the electric field is generated in the disk unit, so that the magnetic field is induced in the wire unit by the generated electric field, with the result that the wireless energy is transmitted using the magnetic resonance method.

4. The apparatus as set forth in claim 1, wherein the meta-material structure comprises:

a plurality of second meta cells each formed of one thin metal film having a split ring resonator form and repeatedly formed on a side of the substrate so that gaps of the thin metal films are directed toward an identical direction so as to have directionality.

5. The apparatus as set forth in claim 1, wherein the wireless energy reception unit comprises:

a wireless reception loop configured to wirelessly receive the wireless energy, transmitted by the wireless energy transmission unit, using the magnetic resonance method using a resonance frequency according to an inductor L and a capacitor C; and a wireless reception meta-material structure placed in a wireless reception path and configured to have the zero refractive index and to receive the wireless energy while concentrating the wireless energy in one direction.

6. The apparatus as set forth in claim 5, wherein the wireless reception loop comprises:

a disk unit comprising first and second conductor plates configured to correspond to each other and to be spaced apart from each other and a dielectric material inserted between the first and second conductor plates, the disk unit functioning as a capacitor so that an electric field can be induced between the first and second conductor plates; and a ring-shaped wire unit having one end connected to the first conductor plate and a remaining end connected to the second conductor plate, the ring-shaped wire unit functioning as an inductor so that a magnetic field can be induced by the electric field.

7. The apparatus as set forth in claim 6, wherein:

the wire unit further comprises first and second terminals for connecting with a load device, and when the wireless energy is received from the wireless energy transmission unit using the magnetic resonance method, the electric field is induced in the disk unit and thus the magnetic field is induced in the wire unit by the induced electric field, so that the induced magnetic field causes current to flow through the wire unit, with the result that the load device is supplied or charged with the wireless energy.

8. The apparatus as set forth in claim 5, wherein the wireless reception meta-material structure comprises:

a substrate configured to have a diameter larger than that of the wireless reception loop; and a meta-material structure configured such that meta cells having a split ring resonance pattern are repeatedly arranged on the substrate.

9. The apparatus as set forth in claim 8, wherein the meta-material structure comprises:

a plurality of first meta cells each formed of one or more thin metal films having a split ring resonator form and repeatedly formed on upper and lower surfaces of the substrate in an identical manner so as to have symmetry; and a plurality of second meta cells each formed of one thin metal film having a split ring resonator form and repeatedly formed on a side of the substrate so that gaps of the thin metal films are directed toward an identical direction so as to have directionality.

* * * * *